Oct. 11, 1966 J. R. KISEDA ETAL 3,278,916

HIGH SPEED MAGNETIC CORE SWITCHING SYSTEM

Filed March 29, 1962 2 Sheets-Sheet 1

INVENTORS
JAMES R. KISEDA
HAROLD E. PETERSEN
WALTER C. SEELBACH
MICHAEL TEIG
BY Frank Chodorowski [signature]
ATTORNEY United States Patent Office 3,278,916
Patented Oct. 11, 1966

3,278,916

HIGH SPEED MAGNETIC CORE SWITCHING SYSTEM

James R. Kiseda, Yorktown Heights, and Harold E. Petersen, Chappaqua, N.Y., Walter C. Seelbach, Scottsdale, Ariz., and Michael Teig, Yonkers, N.Y., assignors to International Business Machines Corporation, New York, N.Y., a corporation of New York Filed Mar. 29, 1962, Ser. No. 183,540
14 Claims. (Cl. 340—174)

The present invention relates to information storage and switching systems and is directed in particular to high speed storage and switching sytems which employ magnetic storage elements.

Storage and logical switching systems employing bistable magnetic elements are well known in the data processing arts. Of particular interset to this invention are those magnetic storage or switching systems which employ coincidence of magnetomotive forces to drive the magnetic elements. Included among these are the well known coincident current magnetic core memory system and core logical devices such as coincidence gates, coincident current switches and the like. These various systems and devices all depend for their operation upon the ability of a magnetic element to distinguish between magnetomotive forces greater than some critical value and those below that value. This critical value is commonly referred to as the switching threshold of the element. In systems which employ current and force summation techniques, a magnetic element is supplied with at least two input means each of which is adapted to supply force below the threshold of the element. Selective alteration of the state of the element is achieved by simultaneous activation of several input means together, thus supplying a total force in excess of the threshold of the element and producing the desired change in state.

Devices and systems which employ this principle of operation suffer the limitation that the individual driving forces must be kept below the switching threshold of the element which imposes a limit to the operational speeds which can be obtained. This limit is well below the switching capabilities of the magnetic elements themselves.

Some increase in operational speed of magnetic devices of the type described has been achieved by the use of so-called "impulse switching" techniques according to which the magnetic elements are subjected to fields well above the "static" or "D.-C." switching threshold but the fields are of very limited duration as reported in an article entitled "The Utilization of Domain Wall Viscosity," by V. L. Newhouse, appearing in the Proceedings of the IRE, November 1957. It has been found that a driving force much greater than the "static" switching threshold of a magnetic element does not produce significant irreversible flux switching if the duration of its application is below some critical time. Thus a "dynamic pulse threshold," which is a function of the duration of the applied field as well as its amplitude, has been found to exist. The field strength for a given duration at which some irreversible switching just occurs for a magnetic element has been termed the "turnover field" for the element as reported in an article entitled "Elastic Switching Properties of Some Square Loop Materials in Toroidal Structures," by W. C. Seelbach et al., appearing in the J.A.P., Supplement to vol. 31, No. 5, pages 135S–136S for May 1960. This property is employed in magnetomotive force summation systems by using plural input means for an element, each of which input means is adapted to supply a force above the static switching threshold of the element but of short enough duration to fall below the dynamic threshold of the element. If one input only is activated, no switching takes place. If, however, two or more inputs are supplied together, switching does occur. The inputs are supplied in coincidence so that the total force is above the dynamic theshold for the force duration employed, and rapid flux reversals take place.

Another well-known method of increasing operational switching speeds is the use of biasing. It is well known that in systems which employ coincident-current selection technique the magnetic element may be biased and each input means may supply a magnetomotive force in opposition to the bias, the magnitude of each input means overcoming the bias and being just below the switching threshold of the element. When long duration pulses are employed, the magnitude of field applied by each pulse is controlled to overcome the bias but does not exceed the static switching theshold of the element. When using pulses of relatively short duration in accordance with the "impulse switching" technique, each pulse is controlled to apply a field which overcomes the bias but does not exceed the "dynamic pulse threshold" of the element. A typical system for employing bias as would be expected is discussed in an article entitled "A Small High-Speed Transistor and Ferrite-Core Memory System," by W. L. Shafer, Jr., et al., appearing in Communications and Electronics, published by A.I.E.E., No. 46 for January 1960, pages 763–769.

The use of biasing leads to expected increased switching speed for a magnetic element in both static and dynamic systems described above, and has been readily explained in terms of switching curves. A switching curve is obtained by taking a plot of applied field versus inverse switching time for a magnetic element. Such a plot describes a family of switching curves each of which defines a certain percentage of the total flux available for switching which is irreversibly switched by applied fields of different magnitudes and different durations. Thus, one switching curve defines the magnitude of field necessary for different time durations for irreversibly switching a predetermined maximum, such as all the flux, that is available for switching. Another or second switching curve defines the magnitude of field which may be applied at different time durations where relatively little flux is irreversibly switched. Since the horizontal axis is plotted in terms of inverse switching time, the duration of such fields is succeedingly shorter when moving along this axis from left to right. The switching curves described above are of a given family in that they are plotted with respect to single impulse fields or the curves, other than the first, may be plotted with respect to fields which are repetitively applied of given amplitude and duration. This latter distinction will be clarified subsequently.

The second switching curve described above is actually a plot of the "dynamic impulse" switching threshold of this core taken on the basis of a single pulse or, the type reported by Seelbach et al., op. cit., which is on the basis of repetitive pulses. Considering the first and second switching curves for the core described above, there exists only one point on the horizontal axis of inverse switching time of the plot at which two fields of the type described by the second curve have a joint magnitude which falls on the first curve. That is, scanning the plot from left to right, the field described by the second curve may be doubled and its magnitude falls above the magnitude defined by the first curve which defines the magnitude and duration of field required to irreversibly switch the flux represented thereby which is available for switching in the core; a point is then reached at which doubling the magnitude of field described by the second curve just meets the requirements dictated by the first curve and beyond this point doubling the magnitude of field described by this second curve falls short of the magnitude of field required for full switching as dictated by the first curve. This point then defines the maximum switching speed or minimum coincident field switching time attainable for the core. Although this point of minimum coincident field switching time may differ for cores made of different material, whatever the material employed, the above plot may be taken and the point of maximum coincident field switching speed ascertained as set forth above.

As previously stated, biasing is known to increase the switching speed of magnetic cores. This expectation is proven by merely translating each of the first and second switching curves by an amount equal to the bias field on the vertical axis of the plot. The point of maximum coincident field switching speed is ascertained in a similar fashion as described above and this point has been found to double the switching speed, i.e., decrease the coincident field switching time attainable by one half, as a maximum for any given core providing the magnitude of the bias is equal to the static threshold of the core. Such a system is somewhat similar to that proposed by W. L. Shafer, Jr., et al., op. cit.

What has been found is that the first and second switching curves previously described for a magnetic core are not merely translated on the vertical axis of applied field by an amount of the bias applied, but such curves are also rotated. The significance of this phenomenon is immediately apparent, in that the expected point of maximum coincident field switching speed as defined above for coincidently applied fields is then found to be significantly increased for any magnetic core. Further, not only has it been found that the switching curves rotate upon application of a bias, but the rotation is greater for those switching curves which define a small amount of irreversible flux change. In a core matrix memory which is word organized, that is, where each column of cores represents a given word and each row of cores represents a given bit for all the words, coincident current selection is employed. To employ a biased switching mode in such a memory in accordance with the observed phenomenon, a slight modification and more details are required. For example, it is well known that during any one writing cycle a core in the word organized memory is subjected to a word field and bit field, while over many writing cycles this same core is subjected to many bit fields due to the selection of cores forming other words in the memory at the same bit position. Although some small amount of irreversible flux switching may be tolerated by a single pulse field such as that provided by the word drive field, continuous applications of bit field which cause some irreversible switching for each pulse cannot be tolerated since the cumulative effect is to destroy the information retained in the cores. Consequently, a plot of applied field versus inverse switching time is taken to find a locus of points which define a switching curve for the core for a small irreversible flux change caused by repetitive application of a pulse field. Such a switching curve will hereinafter be referred to as a "repetitive pulse switching" curve as distinguished from a "single pulse switching" curve. The repetitive pulse switching curve for a small irreversible flux change differs from a single pulse switching curve for the same amount of irreversible flux change in that the magnitude of applied field is less in every instance of given pulse duration. In the word organized memory, the repetitive pulse switching curve is employed for the field to be applied by the bit drivers, while the single pulse switching curve is employed for the field to be applied by the word drivers. It is found that by biasing, the switching curves described are translated and rotated so that a point of minimum coincident field switching time for each core is found which significantly increases the speed of coincident-current writing beyond that hitherto thought possible.

Accordingly, it is a prime object of this invention to provide an improved high speed coincident current switching technique for bistable magnetic elements.

It is another object of this invention to provide an improved high speed switching technique for biased bistable magnetic elements.

Another object of this invention is to provide an improved coincident current switching circuit for biased bistable magnetic elements subjected to repetitive half select fields.

Still another object of this invention is to provide an improved coincident current magnetic memory employing biased bistable magnetic cores.

The foregoing and other objects, features and advantages of the invention will be apparent from the following more particular description of a preferred embodiment of the invention, as illustrated in the accompanying drawings.

Figure 1:
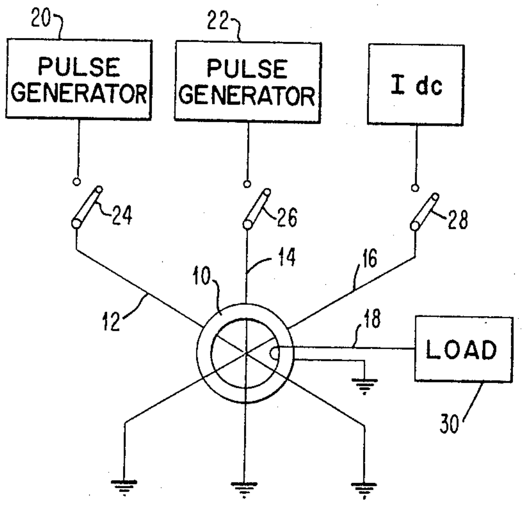
FIG. 1 is a schematic representation of a circuit comprising a bistable magnetic core.
Figure 3:
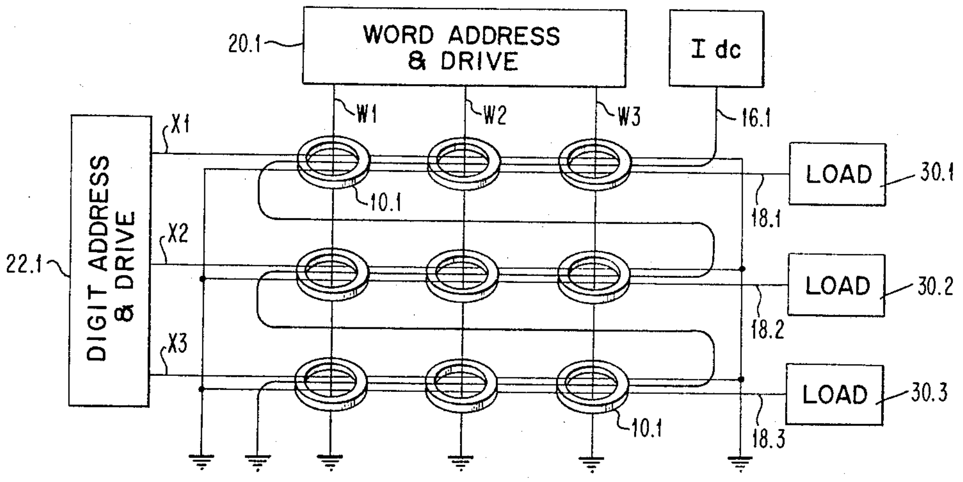
FIG. 3 represents a schematic of a memory according to an embodiment of this invention.
Figure 3A:
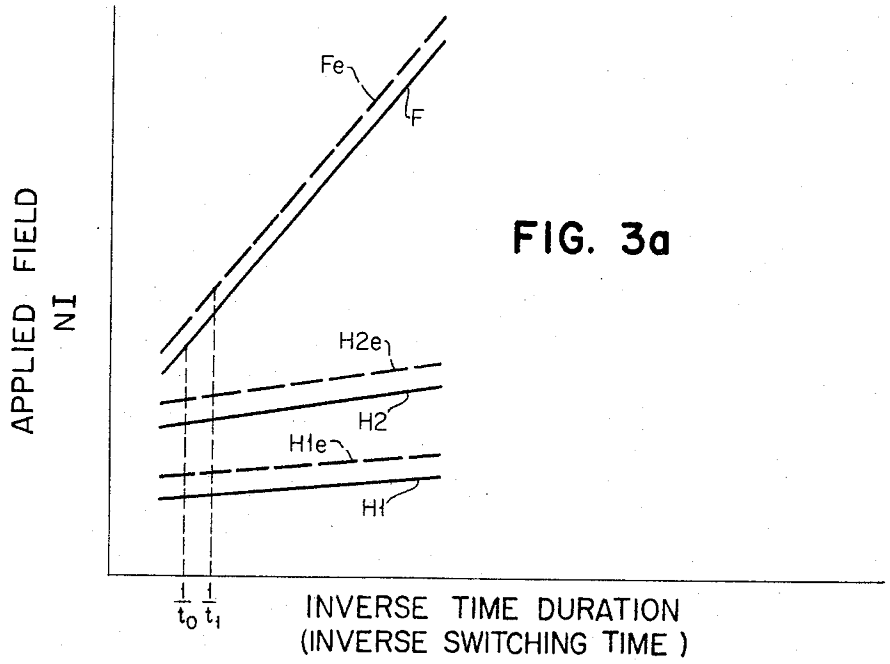
Figure 3B:
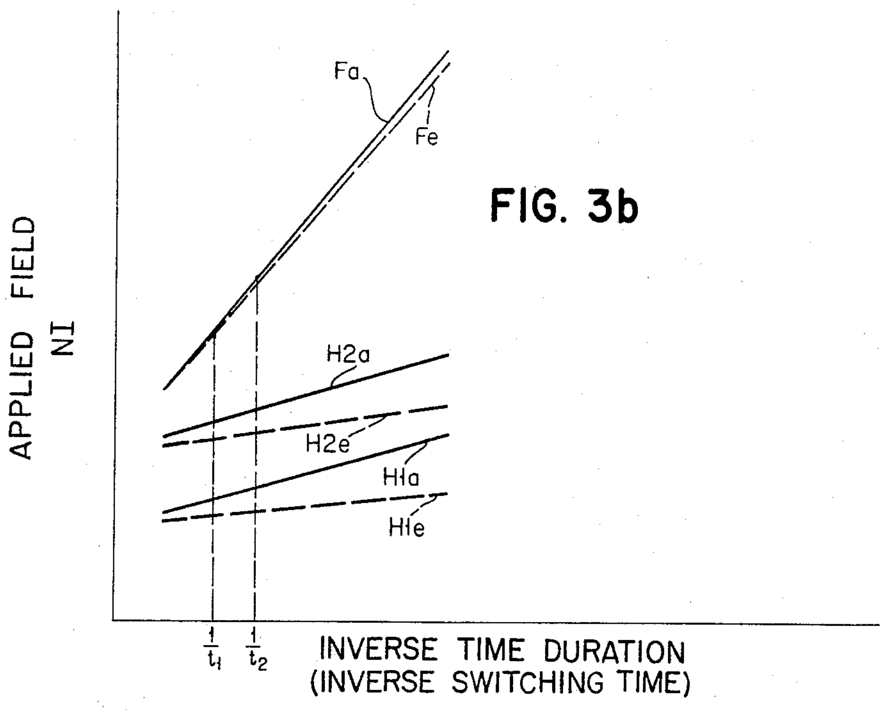

FIGS. 3*a* and 3*b* illustrate plots of applied field versus inverse time duration or inverse switching time, to describe a set of switching curves for the core of FIG. 1.

Referring to FIG. 1, there is shown a core 10 having a pair of input windings 12 and 14, a bias winding 16 and an output winding 18 coupled thereto. The input windings 12 and 14 are connected to pulse generators 20 and 22 through switches 24 and 26, respectively, while the bias winding 18 is connected to a source of bias current I D.C. through a switch 28 and the output winding 18 is connected to an appropriate load 30.

Figure 2:
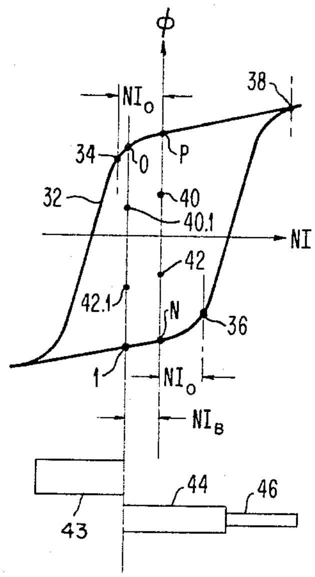
FIG. 2 is a representation of the hysteresis characteristic for the type material employed in the core of FIG. 1.

The core 10 is made of magnetic material exhibiting a substantially rectangular hysteresis loop 32 defining static switching thresholds 34 and 36 and opposite limiting states of remanent flux P and N as shown in the plot of FIG. 2. The maximum amount of flux available for irreversible switching is represented on the loop 32 by the stable remanence states N and P, that is, if the switch 24 were closed and the generator 20 supplied current to the input winding 12 coupling core 10 such that a field having a magnitude as defined by a point 38 on curve 32, which is greater than the static threshold 36 of core 10 of sufficient duration, the core 10 switches from the N state along the curve 32 to a positive saturation point 38. Upon termination of this field, the core 10 relaxes to remanent state P. The difference of flux represented on the vertical axis between points N and 38 represents the total amount of flux switched, however, the difference of flux represented on the vertical axis between points N and P represents the total amount of flux available for irreversible switching since the amount of flux represented on the vertical axis between points P and 38 represents the amount of flux which reverses itself upon termination of the switching field. It is well known that material exhibiting a hysteresis characteristic as shown in FIG. 2 exhibits a plurality of remanence states, such as states 40 and 42, intermediate the limiting remanence states P and N. The states 40 and 42 may be attained by applying a field to the core 10 having a magnitude and duration such that the core is only partially switched, i.e., the energy content of the puse should be sufficient to bring the core to a desired partial switched remanent state, 40. Such partial switching techniques are well known and employed to construct counting circuits and to provide a means for high speed storage. Partial switching techniques for storing binary information is accomplished by switching a core to a remanent state such as state 40 to represent a desired binary bit while the other binary bit is represented by the state N. In memory applications using partial switching the signal to noise ratio has been found to be great enough to allow detection between the states 40 and N. In other partial switching systems, two cores are employed to store a binary bit and each core is switched to one of the intermediate states 40 and 42. The binary information is defined in such systems by determining which core of the two cores is switched to the partially switched state 40. It may be seen, therefore, depending upon the type operation employed, a core is considered as having a predetermined maximum amount of flux available for irreversible switching. With respect to the state N, in one case the maximum amount of flux available for irreversible switching is defined by point P, while in another case this amount is defined by a remanent state such as 40.

In any coincident current switching system employing a bistable magnetic core, such as core 10, a minimum of two input means is provided each of which is operable to apply a magnetic field of given magnitude and duration insufficient of and by itself to switch all the predetermined amount of flux available for irreversible switching but when both are applied, coincidently, will switch all the predetermined amount of irreversible flux available for switching. For the field applied by the respective input means to the core 10, a relationship exist between the magnitude of the field and its duration. This relationship is usually demonstrated by the use of switching curves.

A switching curve is obtained by using one of two methods. The first method employed is to apply magnetic fields to the core of various magnitudes and time durations each of which irreversibly switches a predetermined amount of flux. The second method employed is to apply magnetic fields to the core of various magnitudes and time durations which, when repetitiously applied, the cumulative effect is to irreversibly switch a predetermined amount of flux. The switching curve derived by the first method is termed an impulse switching curve, while the switching curve derived by the second method is termed a repetitive impulse switching curve. It is well known that if the predetermined amount of irreversibly switched flux for both methods is the same, then the fields defined by the curve obtained by the second method are smaller than the fields obtained and defined by the curve of the first method, provided that in each instance, both fields are of the same duration. It is also well known that if two curves are plotted using the same method, when a first such switching curve represents a greater predetermined amount of irreversible flux switched than a second such switching curve, then the fields required by the first curve are greater than the fields required by the second curve, provided, in each instance both fields are of the same duration.

Whatever the method employed to obtain a switching curve, the curve is illustrated by a plot of applied field (NI) versus inverse time duration of the field ($1/t$). In each method, a locus of points is obtained and the switching curve is drawn which represents a predetermined amount of irreversible flux change when a field is applied to the core of a magnitude and duration in accordance with the curve. The switching curve is usually nonlinear, however, a segment of the curve may be represented as being linear over a given range of time durations.

Referring to the FIG. 3*a*, a plurality of switching curves H1, H2 and F are shown which represents segments of actual switching curves taken over a given range of time durations. The curve F represents the magnitude and duration of applied field necessary to irreversibly switch a predetermined maximum amount of flux available for switching in the core 10. The curve F is always an impulse switching curve. The curve H1 represents the magnitude and duration of applied field necessary to irreversibly switch a first predetermined amount of flux of core 10 where the amount of flux represented thereby is less than the maximum defined by curve F. The curve H2 represents the magnitude and duration of applied field necessary to irreversibly switch a second predetermined amount of flux of core 10, where the amount of flux represented thereby is less than the maximum defined by curve F.

The switching curves H1 and H2 shown in FIG. 3*a* may both represent, impulse switching curves, or repetitive impulse switching curves, where curve H2 defines a predetermined amount of irreversible flux switched which is greater than that defined by the curve H1. The switching curve H2 may represent an impulse switching curve while the curve H1 may represent a repetitive impulse switching curve where curves H1 and H2 define a similar predetermined amount of irreversible flux switched. With respect to the curves H1 and H2, there exists, at a single point on the horizontal axis of inverse time duration of the plot, a time duration when the sum of the fields defined by curves H1 and H2 is equal to the field required by curve F. Considered in a different way, there exists only a single point ($1/t_0$) on the axis of inverse time duration of the plot at which the magnitude of field represented by curve H2 added to the magnitude of field represented by curve H1 is equal to the magnitude of field required by curve F at this time duration. This single point ($1/t_0$) on the axis of inverse time duration of the plot of FIG. 3*a* defines the minimum time duration for both the field represented by the switching curve H1 and the field represented by the switching curve H2 which must be coincidently applied to irreversibly switch the predetermined maximum amount of flux available for switching represented by switching curve F. Thus, coincident application of a first field, whose magnitude is in accordance with the curve H1 at a duration corresponding to point ($1/t_0$), and a second field, whose magnitude is in accordance with the curve H2 at duration corresponding to point ($1/t_0$), to the core 10, where the duration of each field is no less than the duration defined by point ($1/t_0$), causes switching of all the flux of core defined by curve F. Since the point ($1/t_0$) defines the minimum time duration of each field defined by curves H1 and H2 to irreversibly switch the flux defined by curve F, then this time duration also defines the maximum switching speed attainable for irreversibly switching the amount of flux of core 10 defined by curve F by coincident application of fields defined by curves H1 and H2. This maximum switching speed is also the minimum switching time, hence the horizontal axis of the plot of FIG. 3*a* is alternately termed the axis of inverse switching time, as is designated in the brackets. Further, since derivation of the point ($1/t_0$), as previously shown, is only considered with respect to the coincidence of two fields, the point ($1/t_0$) is here termed a minimum coincident field switching time. It should be noted, however, that a minimum coincidence field switching time can only be defined with respect to a set of switching curves, such as curves H1, H2 and F, since, different curves define a different point ($1/t_0$).

By closure of switch 28 in FIG. 1, source I D.C. is allowed to energize winding 16 and apply a bias field $NI_B$ to core 10 as is shown in FIG. 2. The magnitude of the field $NI_B$ applied to core 10 is controlled to be less than the magnitude of the static switching threshold 34 of core 10. The stable states of the core 10 defined by loop 32 are then established by the bias field $NI_B$ at positions on the loop 32 arbitrarily labelled 0 and 1. It is well known that biasing of a magnetic core increases its switching speed. This expected increase in switching speed has been and will be explained by use of the switching curves H1, H2 and F of FIG. 3*a*.

Assuming the core 10 is in the 1 stable state, considered a biased datum stable state, it must then be determined what the minimum magnitude of each field defined by curves H1 and H2 is to be and what is their minimum time duration to irreversibly switch the flux defined by curve F at a maximum switching speed. In order to derive the point of minimum coincident field switching time, each of the curves H1, H2 and F are translated on the vertical axis of applied field of the plot of FIG. 3*a* an amount equal to the magnitude of the bias applied. Dashed curves H1*e*, H2*e* and F*e* shown in FIG. 3*a* illustrate this expected translation and a new point ($1/t_1$) is derived defining the minimum coincident field switching time for irreversibly switching the amount of flux defined by curve F*e* by coincidently applying fields defined by curves H1*e* and H2*e*. As may be seen with reference to FIG. 3a, the new point $(1/t_1)$ of minimum coincident field switching time falls higher on the horizontal axis of inverse switching time, hence defining a smaller time duration necessary and a higher switching speed attainable than without biasing the core, as expected. It has been found, however, that the switching curves H1, H2 and F for core 10 are not merely translated as expected on the applied field axis of the plot as shown in FIG. 3a by curves H1e, H2e and Fe, but the curves also rotate as shown in FIG. 3b.

Referring to FIG. 3b, the plot of FIG. 3a is illustrated with dashed curves H1e, H2e and Fe shown defining the expected translated curves H1, H2 and F due to the bias $NI_B$. It has been established, experimentally, that the curves H1, H2, and F are not only translated as expected, but also undergo a positive rotation as illustrated by actual curves H1a, H2a and Fa. Not only do each of the switching curves rotate under influence of a biasing field, but, the amount of rotation differs and depends upon the amount of irreversible flux switched as defined by the switching curves. Hence, the F curve will rotate by a lesser amount than either switching curve H1 or H2. If the predetermined maximum amount of flux represented by curve F as available for irreversible switching is actually the total amount of flux available for irreversible switching, such as that amount between points 1 and 0 in FIG. 2, then the amount of rotation which the curve F undergoes under the influence of a biasing field is negligible. If the amount of irreversible flux switched as represented by curves H1 and H2 is small, say five percent of the total available, then the amount of rotation which the curve undergoes under the influence of a biasing field is substantial. Further, the amount of rotation is also dependent upon the magnitude of bias applied to the core. The rotation of the switching curves has been found to take place about a point of approximately infinite time duration on the plot. The actual point defining the maximum coincident field switching time $(1/t_2)$ when the core 10 is biased is then seen to be higher on the horizontal axis of inverse switching time than the expected point $(1/t_1)$. Thus, a smaller time duration for the fields defined by curves H1a and H2a may be applied to irreversibly switch the flux defined by curve Fa than hitherto thought possible. Fields of the type defined by curves H1a and H2a may be utilized in circuits employing partial switching techniques where the core is not repeatedly subjected to such fields without first being reset. In circuits or systems where the core 10 is to be repeatedly subjected to one or both fields without selection, each application of the field will cause irreversible switching of flux by an amount defined by the curve, i.e., five percent of the maximum. Although complete switching of the core 10 is not desired for repeated application of any one of the fields, the core will nevertheless be "walked" toward an opposite stable state. Such a condition may exist, for example, when high speed switching is desired in a word organized memory where each field applied by the coordinate addressing means is in accordance with an impulse switching curve as subsequently discussed with reference to the memory of FIG. 3.

Referring to FIG. 3, a plurality of cores 10.1 are provided arranged in word columns and bit rows. Each column of cores 10.1 is coupled by a respective word drive conductor W1–W3 while each row of cores 10.1 is coupled by a respective bit drive conductor X1–X3. All cores 10.1 of the memory are coupled by a bias conductor 16.1 which is connected to a source I D.C. at one end and ground at the other end for biasing all cores 10.1 with a field $NI_B$ as shown in FIG. 2. Each row of cores 10.1 is further coupled by a respective sense conductor 18.1–18.3. The word drive conductors W1–W3 are connected to an appropriate word address and drive means 20.1, while the bit drive conductors X1–X3 are connected to an appropriate bit address and drive means 22.1. The sense lines 18.1–18.3 are each connected to a respective load 30.1–30.3. The type memory here illustrated is the well-known word organized memory. Information is written into the memory of FIG. 3 by first energizing a selected word drive conductor W to readout and reset each cores 10.1 of the column to a datum stable state, the 1 stable state. Thus, the selected word drive conductor W is first energized by means 20.1 to apply a field 43, indicated in FIG. 2, in aiding relationship to the bias field $NI_B$, whose magnitude, in addition to the bias overcomes the static threshold 34 of each core 10.1 of the column and whose duration is long enough to insure saturation of the cores in the 1 state. After termination of field 43, each core 10.1 of the selected word column relaxes to the 1 stable state. Thereafter, the same word drive line W is again energized coincidentally with each bit drive line X for each information bit position in which a binary 0 is to be stored. The coincidence of fields applied by both X and W canductors applies a field to the cores in the selected column which overcomes the bias $NI_B$ to irreversibly switch the selected cores to the binary 0 state, or if partial switching is employed, to biased stable state 40.1. As different word columns have information readout and stored therein, each core of the memory is subjected to repetitive bit drive fields. Repetitive application of such a field serves to cause increasing deterioration of the 1 stable state and causes "walking" of the cores toward the state 42.1 and 40.1, destroying the information retained in the core. In order to construct such a memory, a repetitive impulse switching curve must be employed to determine the field which may be applied by each bit drive for a predetermined amount of irreversible flux switched thereby which may be sustained in the system. Since the word drive line is operative only when selection of a particular word takes place, only an impulse switching curve is necessary to define the field applied thereby. In practice, the switching curves defining the different fields to be applied in the coincident system are plotted to define a similar amount of irreversible flux switched. Thus, referring to FIGS. 3a and 3b, the curve H1a is employed to represent a repetitive impulse switching curve for the field applied to each core by the bit drive in the memory of FIG. 3, while the curve H2a is employed to represent an impulse switching curve for the field applied to each core by the word drive in the memory.

It will be appreciated that in systems employing coincident selection techniques wherein a multiplicity of bistable magnetic cores are employed for storing binary information, performing arithmetic switching operations, translating from one code form to another, and the like, a problem exists with respect to time registration of the applied fields in order to insure their coincidence. When operating with short duration fields of the type here contemplated, the registration problem becomes even more critical. Therefore, a field may be applied by the word drive lines whose magnitude and duration is in accordance with one of the switching curves H1a, but whose magnitude and duration is determined by a point on the axis of inverse switching time of the plot, which is less than the duration defined by the point $(1/t_1)$, but greater than the duration defined by the point $(1/t_2)$, as shown by the word field 44 in FIG. 2. The field applied by the bit drive lines of the coincident selection system is then controlled to provide a magnitude and duration in accordance with the other switching curve H2a, as defined by the point $(1/t_2)$ and shown as bit field 46 in FIG. 2. The actual switching speed of the system for each selected core is less than that defined by the duration corresponding to point $(1/t_2)$, but is greater than that defined by the duration corresponding to point $(1/t_1)$, with the advantage of alleviating pulse registration problems. With this in mind, it should be realized that previously, where the upper limit of switching speed was considered to be that defined by the duration corresponding to point $(1/t_1)$, the same type registration problem existed and hence the maximum available switching time of the cores were never realized. Here, even with one input field applied in accordance with one of the curves H1 or H2, whose duration is less than the duration defined by point $(1/t_1)$ and the other field applied in accordance with the other of the curves H1 or H2, whose duration is greater than the duration defined by point $(1/t_1)$, the realized switching speed is still greater than that hitherto realized, since, the effect of both such fields is to define a field duration or switching time beyond the point $(1/t_1)$. In the worst case, the latter fields provide a switching time defined by point $(1/t_1)$, but in the system environment under consideration, this is still a higher switching speed than now attained in similar systems.

In order to aid in understanding and practicing the invention and to provide a starting place for one skilled in the fabrication of the circuits of the invention the following set of specifications for one embodiment of the FIG. 3 is provided below. It should be understood, however, that no limitation should be construed since other component values and operating fields may be employed with satisfactory operation.

In the embodiment of FIG. 3, each of the cores 10.1 may be of the type disclosed and claimed in United States Patent No. 2,986,522, assigned to the assignee of this application, where each core has an inside diameter of 0.019 inch, outside diameter of 0.030 inch being 0.0065 inch thick. The core may have a static switching threshold of 0.22 ampere turns, hereinafter abbreviated as AT, and exhibit a total flux for irreversible switching of approximately 1.25 maxwells. Each core in the unbiased condition may exhibit a minimum coincident field switching time $(t_0)$ of approximately 0.300 microsecond for a word field having a magnitude of approximately 0.300 AT, for a duration of 0.300 microsecond and a bit field having an amplitude of 0.210 AT for a duration of 0.300 microsecond. Each core may be biased by a field of 0.200 AT and thereby exhibit an expected minimum coincident field switching time $(t_1)$ of approximately 0.150 microsecond. The word field actually applied to each biased core 10.1 may be approximately 0.90 AT in magnitude for a duration of 0.075 microsecond while the bit field actually applied to each core of the memory may have an amplitude of 0.55 AT for a duration of 0.075 microsecond to irreversibly switch all the flux available for switching the core within an actual coincident field switching time of 0.075 microsecond as compared with the expected minimum coincident field switching time for the biased condition of approximately 0.150 microsecond.

While the invention has been particularly shown and described with reference to a preferred embodiment thereof, it will be understood by those skilled in the art that various changes in form and details may be made therein without departing from the spirit and scope of the invention.

What is claimed is:

1. In a memory, a plurality of magnetic cores arranged in columns and rows, each said core made of material exhibiting a substantially rectangular hysteresis loop having a static switching threshold, each said core exhibiting a plurality of switching curves for a plot of applied field versus inverse switching time, each said curve defining a locus of points exhibited by said core for a given amount of irreversible flux change for applied fields having different time durations, a first of said switching curves defining a first predetermined amount of irreversible flux change for each said core which is less than a predetermined maximum amount of flux available for irreversible switching, a second of said switching curves defining a second predetermined amount of irreversible flux change for each said core which is less than said predetermined maximum, a third of said switching curves defining said predetermined maximum amount of flux available for irreversible switching in said core, said plot of switching curves defining only a single point $(1/t_0)$ on the axis of inverse switching time representing a minimum coincident field switching time for irreversibly switching the predetermined maximum amount of flux of said core represented by said third curve, by coincident application of a field represented by said first curve and a field represented by said second curve where the sum of the magnitudes of said fields equals the magnitude of applied field represented by said third switching curve, a plurality of column conductors each coupling all cores in a respective column of said memory, a plurality of row conductors each coupling all cores in a respective row of said memory, a plurality of sense conductors each respectively coupling all cores in a respective row and connected to an appropriate load, means for applying to all said cores a magnetic field having a magnitude less than the static switching threshold thereof, to bias each core toward a datum state, said bias field operative to translate each said switching curve on the applied field axis of said plot by an amount equal to the bias field applied whereby a single point $(1/t_1)$ on the axis of inverse switching time of said plot is now defined describing a different point of minimum coincident field switching time for irreversibly switching the predetermined maximum amount of flux of said core defined by said translated third switching curve by coincident application of a field represented by said translated first switching curve and a field represented by said second translated switching curve and where $(1/t_0)<(1/t_1)$, said bias field further operative to positively rotate each said switching curve about a point of approximately infinite time duration whereby a single point $(1/t_2)$ on the axis of inverse switching time of said plot is now defined describing a different point of minimum coincident field switching time for irreversibly switching the predetermined maximum amount of flux of said core defined by the translated and rotated third switching curve by coincident application of a field represented by the translated and rotated first curve and a field represented by the translated and rotated second curve and where $(1/t_1)<(1/t_2)$, readout means for energizing a selected one of said column conductors and establish all the cores coupled thereby in a datum stable state, writing means comprising said selected column conductor and at least a selected one of said row conductors for coincidently applying a column selection field, in accordance with the first rotated and translated switching curve, and a row selection field, in acordance with said second rotated and translated switching curve, to a selected core coupled by both said selected column and row conductors, said selection fields being applied to the selected core in opposition to said bias and wherein at least one of said selection fields is of a shorter time duration than the minimum time duration defined by point $(1/t_1)$ on the axis of inverse switching time of said plot whereby said selected core is switched from the datum stable state to an opposite stable state in accordance with said third translated and rotated switching curve.

2. The memory of claim 1, wherein the second switching curve of each said core is a repetitive impulse switching curve.

3. The memory of claim 2, wherein the predetermined amount of irreversible flux change represented by said first switching curve is similar to the predetermined amount of irreversible flux change represented by said second switching curve.

4. The memory of claim 3, wherein the predetermined maximum amount of flux available for irreversible switching in each said core represented by said third switching curve is less than an actual maximum amount of flux available for irreversible switching in each core.

5. In a circuit, a plurality of magnetic cores each made of material exhibiting a substantially rectangular hysteresis loop having a static switching threshold, each said core exhibiting a plurality of switching curves for a plot of applied field versus inverse switching time, each said curve defining a locus of points exhibited by each said core for a given amount of irreversible flux change for applied fields having different time durations, a first of the switching curves of each said core defining a first predetermined amount of irreversible flux change for each said core which is less than a predetermined maximum amount of flux available for irreversible switching, a second of said switching curves defining a second predetermined amount of irreversible flux change for each said core which is less than said predetermined maximum, a third of said switching curves defining said predetermined maximum amount of flux available for irreversible switching in each said core, said plot of switching curves defining only a single point $(1/t_0)$ on the axis of inverse switching time representing a minimum coincident field switching time for irreversibly switching the predetermined maximum amount of flux of each said core, represented by said third curve, by coincident application of a field represented by said first curve and a field represented by said second curve whose sum is equal to a magnitude of applied field represented by said third curve, means for applying to each said core a magnetic field having a magnitude less than the static threshold of each core to bias each said core in a datum stable state, said bias operative to translate each said switching curve of each core on the applied field axis of said plot by an amount equal to the magnitude of the bias field applied whereby a single $(1/t_1)$ on the axis of inverse switching time of said plot is now defined for each said core describing a different point of minimum coincident field switching time for irreversibly switching the predetermined maximum amount of flux of said core, defined by said translated third switching curve, by coincident application of a field represented by the translated first switching curve and a field represented by the translated second switching curve and where $(1/t_0)<(1/t_1)$, said bias field further operative to positively rotate each said switching curve about a point of approximately infinite time duration whereby a single point $(1/t_2)$ is now defined describing a different point of minimum coincident field switching time for irreversibly switching the predetermined maximum amount of flux of each said core, defined by the translated and rotated third switching curve of each said core, by coincident application of a field represented by the translated and rotated first curve and a field represented by the translated and rotated second curve of each said core and where $(1/t_1)<(1/t_2)$, a plurality of input windings coupling said cores, and means for coincidentally energizing a selected first and a selected second input winding of said plurality of input windings to apply a first field, in accordance with the translated and rotated first switching curve of each said core, and a second field, in accordance with the translated and rotated second switching curve of each said core, to a selected core of said plurality of cores, which fields are in opposition to said bias and wherein at least one of said first and second fields is of a shorter time duration than the minimum time duration defined by point $(1/t^1)$ on the axis of inverse switching time of said plot whereby said selected core is switched from said biased datum stable state to an opposite stable state in accordance with said third translated and rotated switching curve.

6. The circuit of claim 5, wherein at least one of said first and second switching curves of each said core is a repetitive impulse switching curve.

7. The circuit of claim 6, wherein the predetermined maximum amount of flux available for irreversible switching in each said core, represented by said third curve, is less than an actual maximum amount of flux available for irrveersible switching in each core.

8. The circuit of claim 6, wherein the predetermined amount of irreversible flux change represented by said first switching curve is similar to the predetermined amount of irreversible flux change represented by said second switching curve.

9. In a circuit, a magnetic core made of material exhibiting a substantially rectangular hysteresis loop having a static switching threshold, said core exhibiting a plurality of switching curves for a plot of applied field versus inverse switching time, each said curve defining a locus of points exhibited by said core for a given amount of irreversible flux change for applied fields having different time durations, a first of said switching curves defining a first predetermined amount of irreversible flux change for said core which is less than a predetermined maximum amount of flux available for irreversible switching, a second of said switching curves defining a second predetermined amount of irreversible flux change for said core which is less than said predetermined maximum, a third of said switching curves defining said predetermined maximum amount of flux available for irreversible switching in said core, said plot of switching curves defining only a single point $(1/t_0)$ on the axis of inverse switching time representing a minimum coincident field switching time for irreversibly switchnig the predetermined maximum amount of flux of said core represented by said third curve, by coincident application of a field represented by said first curve and a field represented by said second curve where the sum of the magnitudes of said fields equals the magnitude of applied field represented by said third switching curve, means for applying to said core a magnetic field having a magnitude less than the static threshold thereof bias said core in a datum stable state, said bias field operative to translate each said switching curve on the applied field axis of said plot by an amount equal to the magnitude of bias field applied whereby a single point $(1/t_1)$ on the axis of inverse switching time of said plot is now defined describing a different point of minimum coincident field switching time for irreversibly switching the predetermined maximum amount of flux of said core defined by said translated third switching curve by coincident application of a field represented by said translated first switching curve and a field represented by said second translated switching curve and where $(1/t_0)<(1/t_1)$, said bias field further operative to positively rotate each said switching curve about a point of approximately infinite time duration whereby a single point $(1/t_2)$ on the axis of inverse switching time of said plot is now defined describing a different point of minimum coincident field switching time for irreversibly switching the predetermined maximum amount of flux of said core defined by the translated and rotated third switching curve by coincident application of a field represented by the translated and rotated first curve and a field represented by the translated and rotated second curve and where $(1/t_1)<(1/t_2)$, and means for coincidently applying a first field, in accordance with the first translated and rotated switching curve and a second field, in accordance with the second translated and rotated switching curve, to said core in opposition to said bias wherein at least one of said first and second fields is of a shorter time duration than the minimum time duration defined by point $(1/t_1)$ on the axis of inverse switching time of said plot whereby said core is switched from said biased datum stable state to an opposite stable state in accordance with said third translated and rotated switching curve.

10. In the circuit of claim 9, where at least one of said first and second switching curves represents a repetitive impulse switching curve.

11. The circuit of claim 10, where the other of said first and second switching curves represents an impulse switching curve.

12. The circuit of claim 11, where the predetermined amount of irreversible flux change represented by said first switching curve is similar to the predetermined amount of irreversible flux change represented by said second switching curve.

13. The circuit of claim 9, wherein one of said first and second coincidently applied fields is of shorter time duration than a duration corresponding to point $(1/t_1)$ on the axis of inverse switching time of said plot and the other of said applied fields is of greater time duration than a duration corresponding to point $(1/t_1)$.

14. The circuit of claim 9, wherein both said first and second coincidently applied fields is of shorter time duration than a duration corresponding to point $(1/t_1)$ but of longer duration than a duration corresponding to point $(1/t_2)$.

References Cited by the Examiner

UNITED STATES PATENTS

| | | | |
|---|---|---|---|
| 2,900,623 | 8/1959 | Rosenberg | 340—174 |
| 3,027,547 | 3/1962 | Froehlich | 340—174 |
| 3,032,749 | 5/1962 | Newhouse | 340—174 |

OTHER REFERENCES

Tancrell, Roger H. and McMahon, Robert E, Studies in Partial Switching of Ferrite Cores, in Journal of Applied Physics, vol. 31, No. 5, pp. 762–771, May 1960.

BERNARD KONICK, *Primary Examiner.*

IRVING L. SRAGOW, *Examiner.*

H. D. VOLK, G. LIEBERSTEIN, *Assistant Examiners.*